J. GANUS.
HOSE COUPLING FOR RAILWAY AIR BRAKES.
APPLICATION FILED AUG. 14, 1916.

1,239,172.

Patented Sept. 4, 1917.
2 SHEETS—SHEET 1.

Witness

Inventor
Joseph Ganus
By
Bradford & Doolittle
Attorney

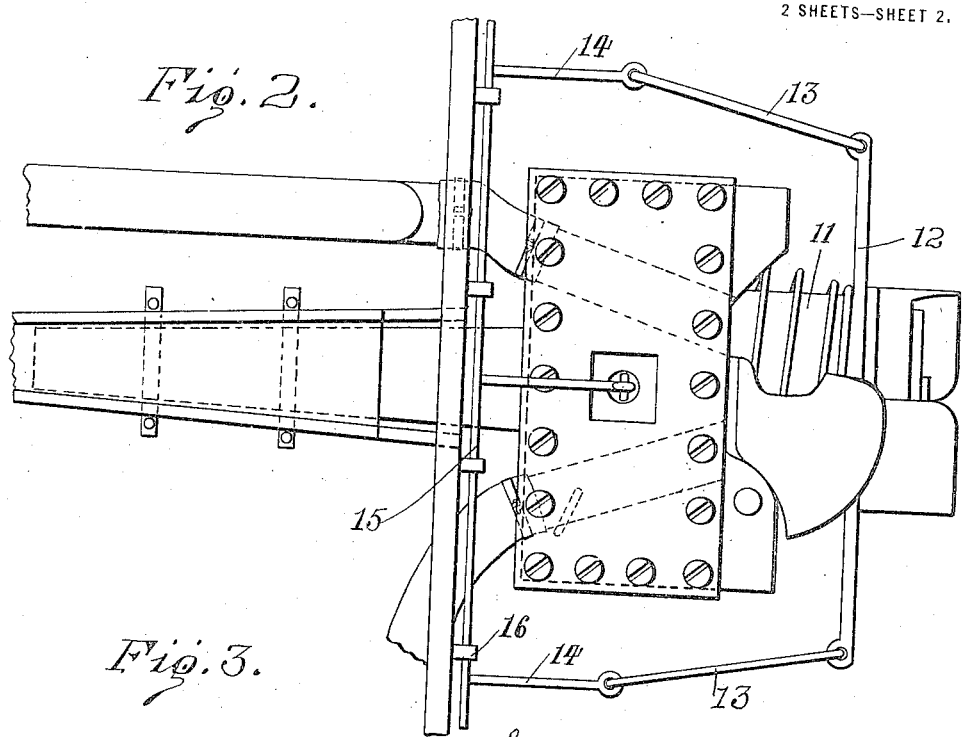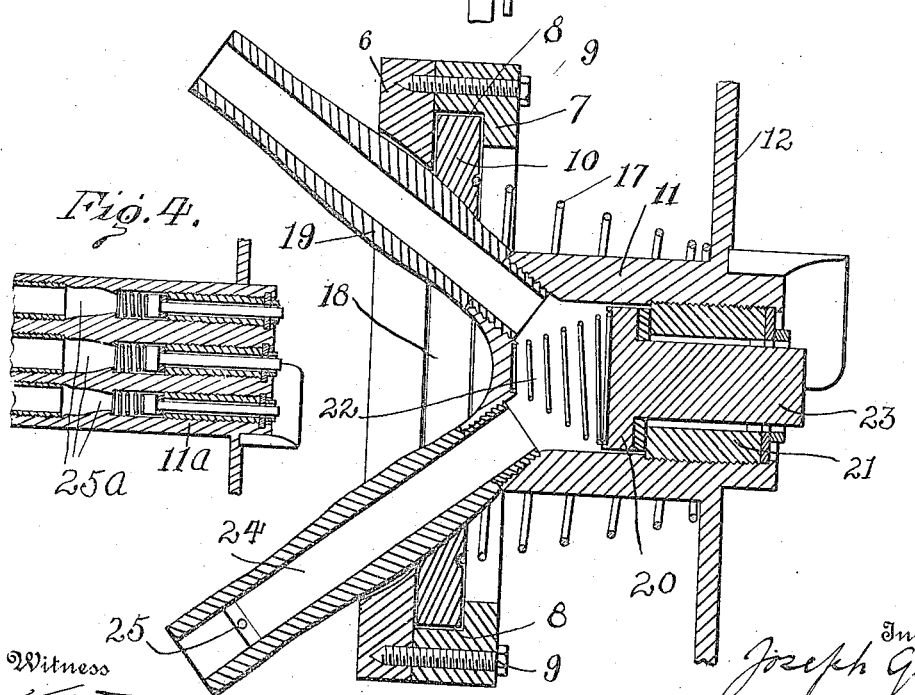

UNITED STATES PATENT OFFICE.

JOSEPH GANUS, OF NOCATEE, FLORIDA.

HOSE-COUPLING FOR RAILWAY AIR-BRAKES.

1,239,172.	Specification of Letters Patent.	Patented Sept. 4, 1917.

Application filed August 14, 1916. Serial No. 114,833.

*To all whom it may concern:*

Be it known that I, JOSEPH GANUS, a citizen of the United States, residing at Nocatee, De Soto county, and State of Florida, have invented and discovered certain new and useful Improvements in Hose-Couplings for Railway Air-Brakes, of which the following is a specification.

The present invention relates to automatic coupling devices for railway air brake systems and consists in the combinations and arrangements of elements hereinafter described and particularly set forth in the accompanying claims.

The invention has for its purpose to provide an apparatus for automatically connecting the coupling members of a railway air brake system, regardless of the distances from the tracks of the hose members of the respective cars, and also without regard to whether the coupling members of the cars themselves have engaged completely or partially.

The invention has for its further purpose to provide an automatic hose coupling system so arranged that the coupling members *per se* will have freedom of movement in substantially universal directions, to the end that the coupling members will be free to give under all conditions of natural usage, and will not be subjected to undue shock when the same are brought together through the connection of the cars.

The invention has for its further purpose to provide an arrangement of hose couplings with each element thereof having an auxiliary pipe connection, to the end that the train pipe system may be connected continuously in the event that the connected car is not provided with the type of coupling member herein disclosed.

The invention is shown by way of illustration in the accompanying drawings, wherein—

Figure 1:
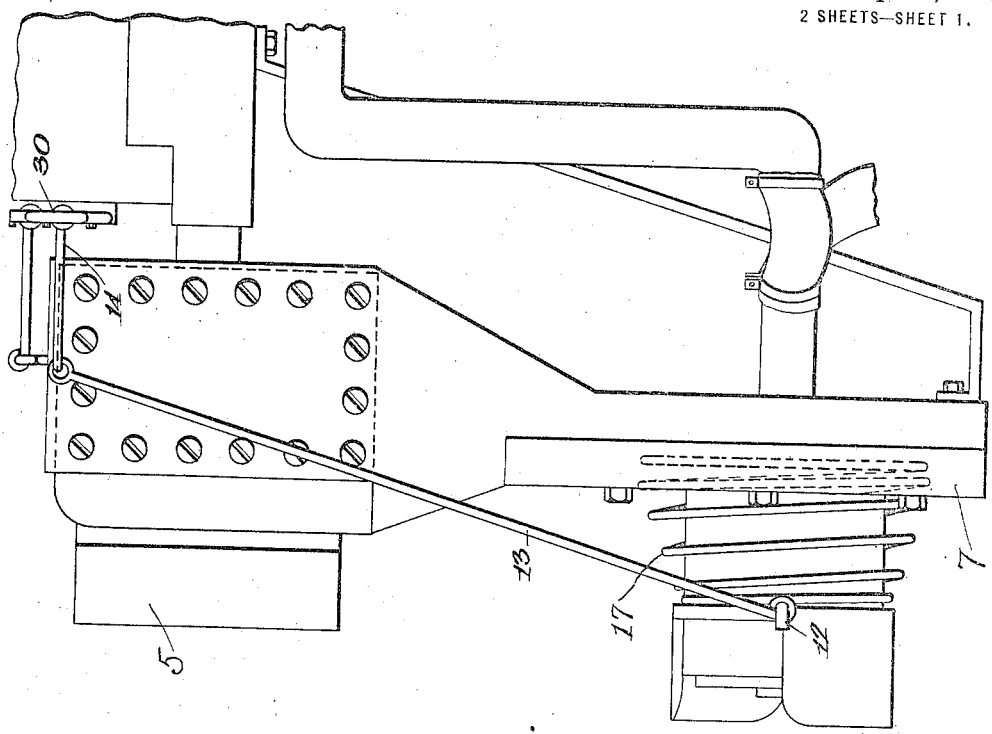
Figure 1:
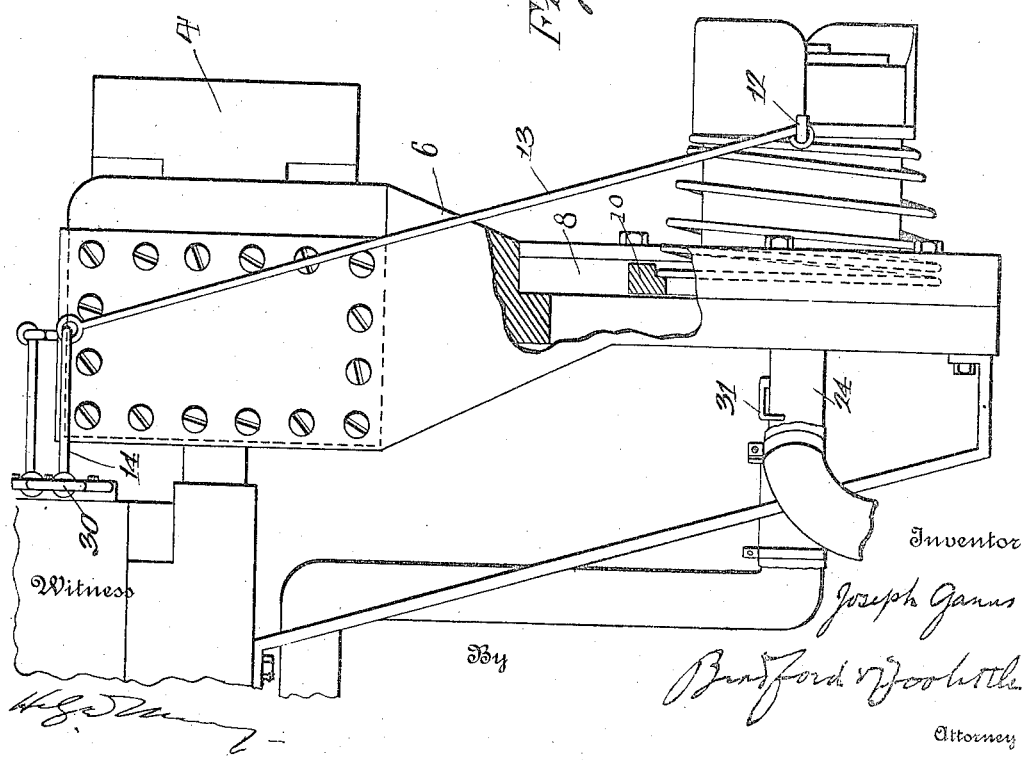

Figure 1 is a side elevational view showing the hose coupling members mounted on the coupling members of two cars, Fig. 2 a top plan view of a car coupling member and the hose coupling device attached thereto, Fig. 3 a horizontal sectional view of the hose coupling device *per se*, and Fig. 4 a sectional view of a modified form of train line coupling.

Referring to the construction in detail, and with like reference characters designating corresponding parts, 4 and 5 indicate the respective coupling members of two cars that are of any ordinary construction and with which the present invention is not concerned. The hose coupling device forming the basis of the present case has both elements thereof constructed identically and a description of one thereof will suffice.

A suitable support or frame 6 is rigidly and dependingly mounted from the car coupling, and, at its lower portion, is formed with a removable frame piece 7 having projecting edges to provide grooves 8. The part 7 is secured to the part 6 by a plurality of screw-bolts 9, or in any other approved manner. A frame piece 10 is mounted to have vertical movement within the slots 8, to the end that the hose coupling piece 11 may be adjusted vertically with regard to its complementary coupling part on the connected car.

The hose coupling member 11 has fitted thereon a bar 12 providing arms projecting to either side and connecting, respectively, with links 13 that engage with levers 14 of a manually-operated shaft 15 that is journaled in suitable brackets 16 on the car body adjacent the car coupling member (4 or 5). The rod 15 may be provided with a suitable treadle, or hand-turning lever 30, for actuating the same to raise and lower the coupling member in accordance with the respective heights of the cars to be coupled. This manual adjusting device is not set positively, but permits free play to the coupling head.

The member 11 is mounted on the slidable part 10 by means of a spiral spring 17 that gives the proper resiliency to withstand the shocks incident to the coupling of the cars; and said slidable piece 10 is centrally cut away, as at 18, to provide the necessary clearance for the endwise movements of the coupling piece, as will be understood.

A pipe or hose coupling 19 is connected to communicate with the chamber of the coupling member 11 and with the source of air pressure, and a valve 20 is slidably mounted in a suitable bushing 21 that is secured within said part 11. The valve 20 is normally held seated under the tension of the spring 22, and is constructed with a stem portion 23 that projects beyond the engaging face of the coupling element, to the end that it will be automatically unseated through engagement with the corresponding part of the coupling element to which it is connected, and thereby automatically bring the train pipe system of the coupled car into communication with the source of air pressure.

The coupling member 11 is also provided with a hose or pipe section 24 that provides an auxiliary by-pass for the air when the valve is seated, and in this capacity it is employed when the coupled car is not provided with a form of coupling that would unseat the valve 20 when connected to the part 11. Said auxiliary pipe 24 is fitted with a valve 25 having a handle 31 for controlling the passage of air in the emergency stated.

In Fig. 4 I show a slightly modified coupling member 11$^a$, provided with a plurality of openings 25$^a$, which are adapted to register with a plurality of train lines for coupling the same in substantially the manner above described.

It is obvious that those skilled in the art may vary the details of construction and arrangement of parts without departing from the spirit of my invention, and therefore I do not wish to be limited to such features except as may be required by the claims.

Having thus fully described my said invention, what I claim as new and desire to secure by Letters Patent, is:

1. In a hose coupling for railway air brake systems, the combination of a rigid support having guide-ways, a member slidably mounted on said guide-ways, manually actuated means for adjusting said member, a spiral spring mounted on said member, and a hose coupling member mounted on said spring to have resilient movement in a plurality of directions, substantially as set forth.

2. In an automatic hose coupling for railway air brake systems, the combination with a car coupling member, of a frame mounted on said car coupling member and constructed with guide-ways, a member slidably mounted in said guide-ways, a resilient body mounted on said member, a hose coupling member mounted on said resilient body, and a manually actuated means for adjusting said slidable member, substantially as set forth.

3. In an automatic hose coupling for railway air brake systems, the combination with a car coupling, supports rigidly mounted on the members of said car coupling respectively, members vertically adjustable on said supports and provided with openings, means for adjusting said members, spiral springs seated on said slidable members at said openings, and hose coupling members mounted on said spiral springs respectively to have resilient movement in a plurality of directions, substantially as set forth.

4. In an automatic hose coupling for railway air brake systems, the combination with a car coupling, of a support rigidly mounted on said car coupling member, a member slidably mounted on said support, a resilient body mounted on the slidable member, a hose coupling member mounted on said resilient body, a valve associated with the hose coupling member, and a pipe connected to communicate with the hose coupling member providing means for forming an auxiliary air by-pass for the train pipe system when said valve is seated, substantially as set forth.

5. In an automatic hose coupling for railway air brake systems, the combination with a car coupling, of supports rigidly mounted on the members of said car coupling respectively, members slidably mounted on said rigid supports and provided with openings, springs mounted on the respective slidable members at said openings, hose coupling members mounted on said springs respectively, valves associated with the hose coupling members, said valves being normally seated and adapted to be reciprocally unseated by mutual contact, and a pipe mounted on each of said hose coupling members adapted to provide an auxiliary air passage for the train pipe system when its respective valve is seated, substantially as set forth.

In witness whereof, I have hereunto set my hand and seal at Washington, District of Columbia, this eleventh day of August, A. D. nineteen hundred and sixteen.

JOSEPH GANUS. [L. S.]

Witnesses:
E. G. CLEMENTS,
L. I. McBATH.

Copies of this patent may be obtained for five cents each, by addressing the "Commissioner of Patents, Washington, D. C."